United States Patent
Acharya et al.

(10) Patent No.: US 7,411,900 B2
(45) Date of Patent: Aug. 12, 2008

(54) FAST RESTORATION FOR VIRTUALLY-CONCATENATED DATA TRAFFIC

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 952 days.

(21) Appl. No.: 10/446,220

(22) Filed: May 28, 2003

(65) Prior Publication Data

US 2004/0252633 A1 Dec. 16, 2004

(51) Int. Cl.
*G01R 31/08* (2006.01)
(52) U.S. Cl. ...................... 370/217; 370/907
(58) Field of Classification Search ............. 370/228
See application file for complete search history.

(56) References Cited

U.S. PATENT DOCUMENTS

| | | | | |
|---|---|---|---|---|
| 6,014,707 A * | 1/2000 | Miller et al. | ............... | 709/232 |
| 6,606,297 B1 * | 8/2003 | Magill et al. | ............... | 370/216 |
| 6,667,989 B1 * | 12/2003 | Sekii et al. | ............... | 370/465 |
| 6,697,373 B1 * | 2/2004 | Sandstrom | ............... | 370/405 |
| 6,912,201 B1 * | 6/2005 | Yoshida et al. | ............... | 370/248 |
| 6,965,612 B2 * | 11/2005 | Chohan et al. | ............... | 370/465 |
| 7,020,158 B2 * | 3/2006 | Rouaud | ............... | 370/465 |
| 7,058,008 B1 * | 6/2006 | Wilson et al. | ............... | 370/216 |
| 7,167,442 B2 * | 1/2007 | Courtney et al. | ............... | 370/217 |
| 7,298,744 B1 * | 11/2007 | Suh et al. | ............... | 370/393 |
| 2002/0181479 A1 * | 12/2002 | Okuno | ............... | 370/404 |
| 2003/0165115 A1 * | 9/2003 | Sutoh et al. | ............... | 370/216 |
| 2004/0076176 A1 * | 4/2004 | Kfir | ............... | 370/465 |
| 2004/0081081 A1 * | 4/2004 | Colombo | ............... | 370/216 |

FOREIGN PATENT DOCUMENTS

WO WO 00/31986 * 6/2000 ................. 340/2.2

OTHER PUBLICATIONS

ITU-T Recommendation G.7042/Y.1305—Corrigendum 1, "Link Capacity Adjustment Scheme (LCAS) for Virtual Concatenated Signals," 16 pages, 2002.

(Continued)

*Primary Examiner*—Chau Nguyen
*Assistant Examiner*—Timothy J Weidner (57) ABSTRACT

Techniques are disclosed for restoration of virtually-concatenated data traffic in a data transmission network. A virtually-concatenated group is formed comprising: (i) a plurality of primary members each associated with a corresponding data stream, and (ii) at least one backup member. Each of the plurality of primary members and the backup member of the virtually-concatenated group may be assigned a corresponding one of a plurality of data transmission routes between first and second nodes of the network. Responsive to a failure of a given one of the plurality of primary members, the backup member is utilized for restoring at least a portion of the data traffic of the given member. The invention also provides a modified link capacity adjustment scheme (LCAS) protocol which substantially reduces the time required to report changes in member status information from a sink node to a source node, thereby substantially reducing the amount of time required to perform a restoration operation.

23 Claims, 7 Drawing Sheets

OTHER PUBLICATIONS

ITU-T Recommendation G.7042/Y.1305, "Link Capacity Adjustment Scheme (LCAS) for Virtual Concatenated Signals," 24 pages, 2001.

ITU-T Recommendation G.707/Y.1322, "Network Node Interface for the Synchronous Digital Hierarchy," 184 pages, 2000.

U.S. Appl. No. 10/745,881, filed Dec. 26, 2003, S. Acharya et al., "Route Determination Method and Apparatus for Virtually-Concatenated Data Traffic."

J. Edmonds et al., "Theoretical Improvements in Algorithmic Efficiency for Network Flow Problems," Journal of ACM, vol. 19, No. 2, pp. 248-264, Apr. 1972.

James B. Orlin, "A Faster Strongly Polynomial Minimum Cost Flow Algorithm," Proceedings of the 20th ACM Symposium on the Theory of Computing, pp. 377-387, 1988.

\* cited by examiner

FAST RESTORATION FOR VIRTUALLY-CONCATENATED DATA TRAFFIC

FIELD OF THE INVENTION

The present invention relates generally to data communication networks which utilize virtual concatenation, and more specifically to techniques for restoring data transmission through such a network in the event of route failure.

BACKGROUND OF THE INVENTION

As is well known, virtual concatenation (VC) and link capacity adjustment scheme (LCAS) protocols have been developed which allow more efficient use of the existing fixed-bandwidth connections associated with synchronous optical network (SONET) or synchronous digital hierarchy (SDH) network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node, also referred to herein as a sink node. The sink node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

Conventional restoration techniques in the SONET/SDH context are designed to provide fast restoration in the event of route failure, where "fast" restoration generally denotes restoration of the associated data traffic in less than about 50 milliseconds. However, this fast restoration comes at the cost of excessive bandwidth overhead. More specifically, these conventional techniques generally utilize 1+1 primary-backup protection, wherein each primary route has a corresponding backup route, resulting in 100% bandwidth overhead.

It should also be noted that the above-described LCAS protocol takes on the order of 64 or 128 milliseconds, for respective higher order (HO) or lower order (LO) implementations, in order to complete the above-noted temporary removal of members associated with failed routes. This delay is attributable to the refresh timing mechanism of the LCAS protocol. Therefore, the LCAS protocol in its current form is unable to deliver the approximately 50 millisecond fast restoration generally associated with SONET/SDH networks. This not only precludes its use for restoration but also makes SONET 1+1 protection in conjunction with LCAS ineffective.

A possible alternative approach is to transmit the data traffic without providing any protection at the SONET/SDH layer of the network, in the expectation that higher layers, such as an Ethernet layer, will be able to provide a certain measure of protection. For example, in the case of the above-noted EoS data traffic, rapid Ethernet spanning tree protection in the Ethernet layer may be used for restoration in the event of route failure. However, this type of restoration by higher network layers can lead to a number of significant problems, such as disruption of data traffic for up to several seconds, loss and duplication of data, etc.

As is apparent from the foregoing, conventional techniques are unable to provide fast restoration, on the order of 50 milliseconds or less, while utilizing less than 100% bandwidth overhead. A need therefore exists for improved restoration techniques which overcome one or more of the above-noted problems.

SUMMARY OF THE INVENTION

The present invention provides improved techniques for protection of data traffic in a data communication network against route failure. The techniques are particularly well-suited for use with Ethernet over SONET (EoS) data traffic, but can also be used with other types of virtually-concatenated data traffic.

In accordance with one aspect of the invention, a virtually-concatenated group is formed comprising: (i) a plurality of primary members each associated with a corresponding data stream, and (ii) at least one backup member. Each of the plurality of primary members and the backup member of the virtually-concatenated group may be assigned a corresponding one of a plurality of data transmission routes between first and second nodes of the network. The first and second nodes may be a source-sink node pair, an ingress-egress node pair, or any other pair of network nodes. Responsive to a failure of a given one of the plurality of primary members, the backup member is utilized for restoring at least a portion of the data traffic of the given member.

By way of example, if each of the plurality of primary members and the backup member is assigned a corresponding route between the first and second nodes that is fully diverse from the routes assigned to the other members, a single additional member may be used as the backup member.

As another example, if the routes assigned to the primary members are not fully diverse, a designated minimum number of backup members may be included in the virtually-concatenated group. The designated minimum number of backup members may be determined as the total number of primary members which share a link that carries data traffic from the greatest number of the primary members.

In accordance with another aspect of the invention, a modified link capacity adjustment scheme (LCAS) protocol is provided which substantially reduces the time required to report changes in member status information from a sink node to a source node, thereby substantially reducing the amount of time required to perform a restoration operation. The modified protocol is configured such that the sink node sends member status information to the source node only for actual members of the virtually-concatenated group. More specifically, a plurality of reserve bits may be utilized as a member status indicator that is updatable in an arbitrary manner from multiframe to multiframe, with the member status indicator for a given multiframe specifying a particular set of the members for which member status information is sent in the given multiframe.

In an illustrative embodiment, further reductions in restoration time may be provided by configuring the sink node to maintain for the virtually-concatenated group a list of B buckets, with each bucket capable of being identified by a bucket identifier corresponding to a member status indicator, such that in the absence of failures the member status indicator values cycle from 0 to B-1. The bucket identifier of a first bucket in the list of B buckets specifies a member status indicator indicating the particular members for which member status information is sent from the sink node to the source node in a current multiframe. In conjunction with failure of a member, recovery of a previously-failed member, addition of a member to the virtually-concatenated group, or other similar event, a bucket identifier is determined for the corresponding member as a function of the sequence number of that member, and assigned to a first bucket in the list of B buckets. As a result, a normal cycle of the member status indicators is broken in order to expedite the sending of member status information for the affected member(s).

Advantageously, the present invention provides low-overhead, standards-compliant fast restoration techniques for EoS data traffic or other types of data traffic which utilize virtual concatenation. The illustrative embodiments provide restoration that is not only fast, as low as about two milliseconds in certain cases and substantially less than about 50 milliseconds in most cases, but also requires significantly lower bandwidth overhead than conventional techniques. In addition, the techniques in the illustrative embodiments may be configured for backwards compatibility with existing VC and LCAS standards, thereby allowing a network element configured to implement a restoration technique of the present invention to interoperate with standard VC and LCAS enabled network elements.

DETAILED DESCRIPTION OF THE INVENTION

The invention will be illustrated herein in conjunction with illustrative embodiments of restoration techniques and an associated network-based system and example network nodes in which the restoration techniques may be implemented. It should be understood, however, that the invention is not limited to use with the particular restoration techniques and network-based system or network node implementations described, but is instead more generally applicable to any routing application in which it is desirable to provide improved restoration performance.

The present invention in the illustrative embodiments to be described provides restoration that is not only fast, as low as about two milliseconds in certain cases and substantially less than about 50 milliseconds in most cases, but also requires significantly lower bandwidth overhead than conventional techniques. As a result, the invention allows considerably more efficient transmission of Ethernet over SONET (EoS), and other types of data traffic which utilize virtual concatenation, than has heretofore been possible.

One aspect of the invention is directed to a network protection technique which involves configuring a virtually-concatenated group (VCG) to include, in addition to its primary members as in a conventional implementation, at least one additional member, referred to herein as a "backup member," which does not transmit data traffic under normal operating conditions. Each of the primary and backup members of the VCG is assigned a data transmission route between first and second nodes of the network. The first and second nodes may be a source-sink node pair, an ingress-egress node pair, or any other pair of network nodes. If a route assigned to one of the primary members fails, the route assigned to the backup member is utilized for restoring data traffic of that primary member. This aspect of the invention will be described in greater detail below in conjunction with FIGS. 1A and 1B.

Another aspect of the invention is directed to a modified LCAS protocol which eliminates the previously-described restoration delay problems associated with refresh timing in the conventional LCAS protocol. This aspect of the invention will be described in greater detail below in conjunction with FIGS. 2, 3 and 4.

It should be noted that the network protection and modified LCAS protocol aspects of the invention can be used independently of one another, or together. A given embodiment of the invention may therefore implement the network protection aspect, the modified LCAS protocol aspect, or both of these aspects.

Figure 1A:
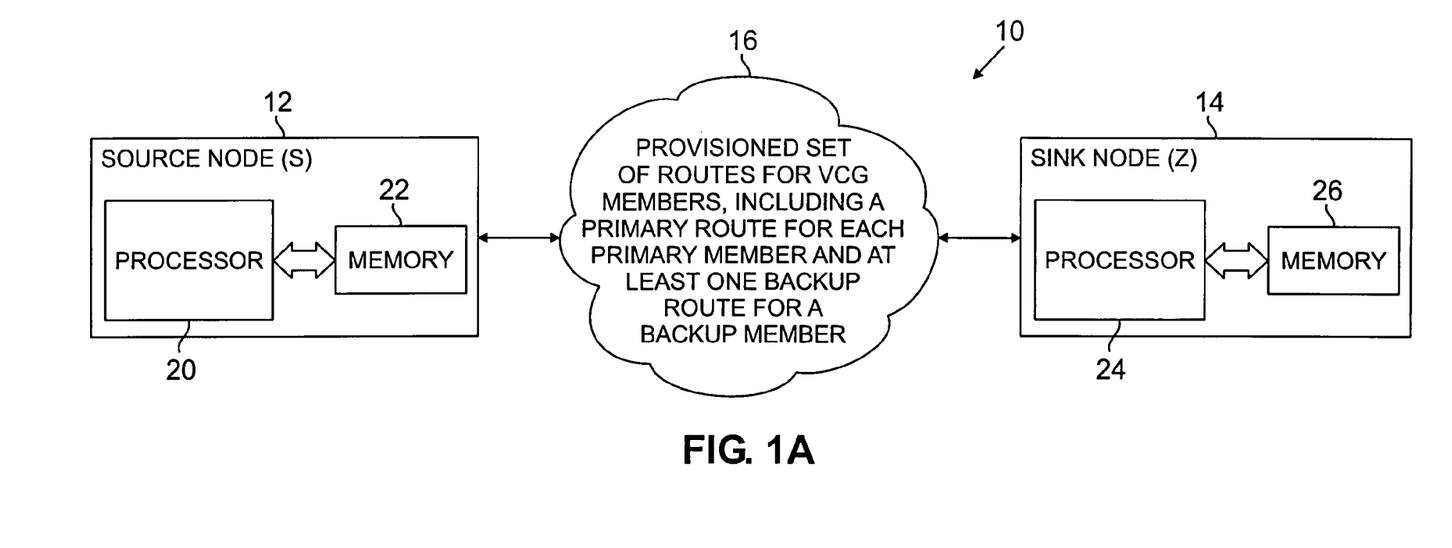
FIG. 1A illustrates a portion of a data transmission network in accordance with an illustrative embodiment of the invention.

Referring now to FIG. 1A, a data transmission network 10 includes a source node 12, a sink node 14, and a provisioned set of routes 16 for VCG members. It is to be appreciated that the figure shows only a portion of a typical network, for simplicity and clarity of description.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well-known in the art and therefore will not be described in detail herein.

In accordance with the invention, the VCG for which the set of routes 16 are provisioned includes a plurality of primary members and at least one backup member.

A "primary member" as the term is used herein refers generally to a conventional VCG member which is associated with a corresponding data stream to be transmitted from the source node to the sink node under normal operating conditions.

A "backup member" as the term is used herein refers generally to an additional VCG member which is not associated with any particular data stream to be transmitted from the source node to the sink node under normal operating conditions.

The FIG. 1A arrangement is thus in contrast to conventional VCGs, in which each member is a primary member and there are no backup members.

It is generally preferably to form the VCG so as to include the minimum number of backup members required to protect the entire VCG against a single route failure.

For example, in an embodiment in which all of the primary members are diversely routed from source node 12 to sink node 14, only a single backup member may be used. Therefore, in a VCG formed to include N primary members and one backup member, each having the same bandwidth allocation, protection against the single route failure requires a bandwidth overhead that is only a fraction 1/N of the 100% bandwidth overhead associated with certain of the previously-described conventional techniques.

As another example, in an embodiment in which all of the primary members are not diversely routed, a minimum number of required backup members may be determined based on the link that carries data traffic from the greatest number of members. Generally, the minimum number of backup members required would be the same as the total number of primary members carried by the link supporting the greatest number of primary members.

Such an embodiment may be viewed as including, for example, a number $N_X$ of primary members and a number $N_Y$ of backup members, with diverse routing provided between the primary and backup members, but not necessarily within the set of $N_X$ primary members or $N_Y$ backup members.

In the above examples, configuring the VCG in accordance with the invention results in a substantial reduction in bandwidth overhead relative to conventional SONET 1+1 primary-backup protection. As described previously, this conventional approach requires that each primary route have a corresponding backup route, resulting in 100% bandwidth overhead. In the illustrative embodiments, the bandwidth overhead decreases with the diversity of the routes of the primary members, and as noted above, for N diversely routed primary members may be as low as a fraction 1/N of the conventional 100% bandwidth overhead requirement.

It was indicated above that the one or more backup members of the VCG are not used to transmit data traffic under normal operating conditions. However, in the event of the failure of a route associated with one or more of the primary members, the affected data traffic may be restored utilizing the backup member(s). For example, if the source node 12 detects the failure of the route assigned to a given member, as reported by the sink node 14 or otherwise, it "discards" the failed member and starts sending the corresponding data traffic on a backup member. Advantageously, this switching of data traffic in the illustrative embodiments can be achieved in a very short amount of time, in some cases as short as about two milliseconds.

It should be noted that a single backup member need not be capable of restoring all of the data traffic associated with a given failed primary member. For example, in alternative embodiments, one or more backup members may each be utilized for partial restoration of the data traffic of a given failed primary member. The term "restoring data traffic" and similar terminology used herein should be understood to include without limitation full or partial restoration of data traffic of a failed primary member by one or more backup members.

Figure 1B:
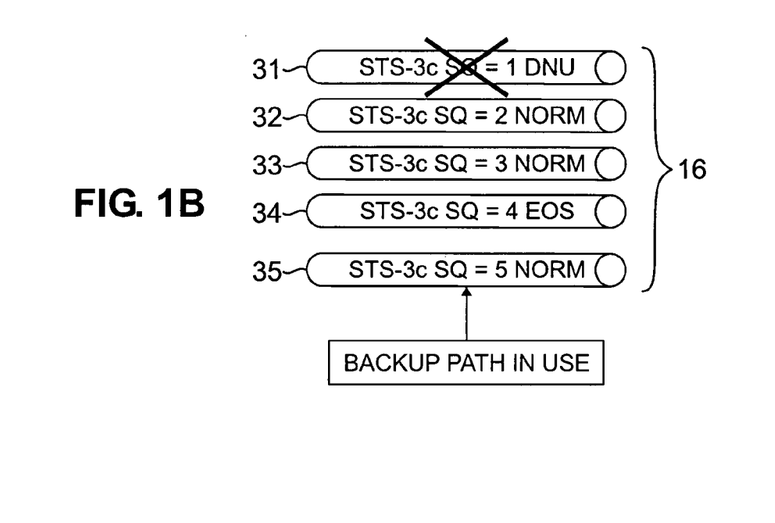
FIG. 1B shows an example of a provisioned set of routes for a given virtually-concatenated group (VCG) configured in accordance with the invention.

FIG. 1B shows a more particular example of the provisioned set of routes 16 in network 10 of FIG. 1A. In this example, the corresponding VCG is formed to include a total of five members, with four primary members and one backup member. The primary members and their associated routes are designated as elements 31, 32, 33 and 34 in the figure. The backup member and its associated route is designated as element 35 in the figure. The members 31 through 35 have respective sequence (SQ) numbers 1 through 5.

Each of the primary and backup members has the same bandwidth in this example. More specifically, each of the members is configured to support data traffic associated with a conventional STS-3c data rate signal, where STS denotes "synchronous transport signal." The VCG in this example may be referred to as an STS-Xc-Yv VCG, where X=3 and Y in this case denotes the number of primary and backup members of the group.

It should be understood, however, that the invention does not require the use of any particular signal or bandwidth configuration for the individual members, or that all members have the same signal or bandwidth configuration.

Backup member 35 does not carry any data traffic during normal operation. The source node 12 therefore transmits a DO NOT USE (DNU) indicator in the LCAS control word (CTRL) for the backup member 35 during normal operation to ensure that the sink node does not pick up any data traffic from backup member 35.

The example of FIG. 1B more particularly illustrates not this normal operation condition, but instead a failure condition in which at least a portion of the route associated with primary member 31 has failed. Such a route failure is an example of what is more generally referred to herein as a "member failure." It is to be appreciated, however, that the term "member failure" as used herein is intended to include any type of failure associated with the corresponding primary member that prevents it from transmitting data at the desired rate.

A given failure may be signaled in accordance with the conventional LCAS protocol, in which the sink node 14 detects the failure and reports the status of the failed member as NOT-OK back to the source node 12.

Upon receiving notification of a member failure, the source node 12 switches the data traffic from the failed primary member to the backup member, and transmits a NORMAL (NORM) indicator in the LCAS control word for the backup member and the DNU indicator in the LCAS control word for the failed primary member.

As shown in FIG. 1B, as a result of this restoration process, the NORM indicator is transmitted for primary members 32, 33 and 34 and for the backup member 35, and the DNU indicator is transmitted for the failed primary member 31.

This illustrative embodiment thus distinguishes primary members from backup members of a given VCG under normal operation by sending the NORM indicator in the LCAS control words of the primary members and the DNU indicator in the LCAS control words of the backup members. In accordance with the foregoing description, the source node may be viewed as being operative, upon receiving notification of the failure of a primary member, to "swap" the NORM indicator value of the LCAS control word of the failed primary member, with the DNU indicator value of the LCAS control word of one of the backup members, in the next multiframe. At the end of the multiframe header, the source node may start putting the data on the backup member instead of the failed primary member. Therefore, from the time the source node has received the notification of failure, it generally takes one complete multiframe, that is, two milliseconds or eight milliseconds for respective higher order (HO) and lower order (LO) implementations, before the backup member can start carrying the data of the failed primary member.

The exemplary restoration technique described above in conjunction with FIGS. 1A and 1B can achieve a fast restoration time, as low as about two milliseconds in some cases, through the use of the above-noted modified LCAS protocol. Instead of using multiframe indicator (MFI) bits to send member status information from the sink node 14 to the source node 12, the modified LCAS protocol in the illustrative embodiments utilizes extra bits taken from reserve bits defined in the above-noted standards documents to send the member status information. Therefore, in the event of a member failure, the sink node can immediately send to the source node the status of the failed member instead of waiting for its turn to arrive in the refresh cycle. An important advantage of this approach is that it avoids the restoration delay problems attributable to excessive refresh time in the conventional LCAS protocol.

Figure 2:
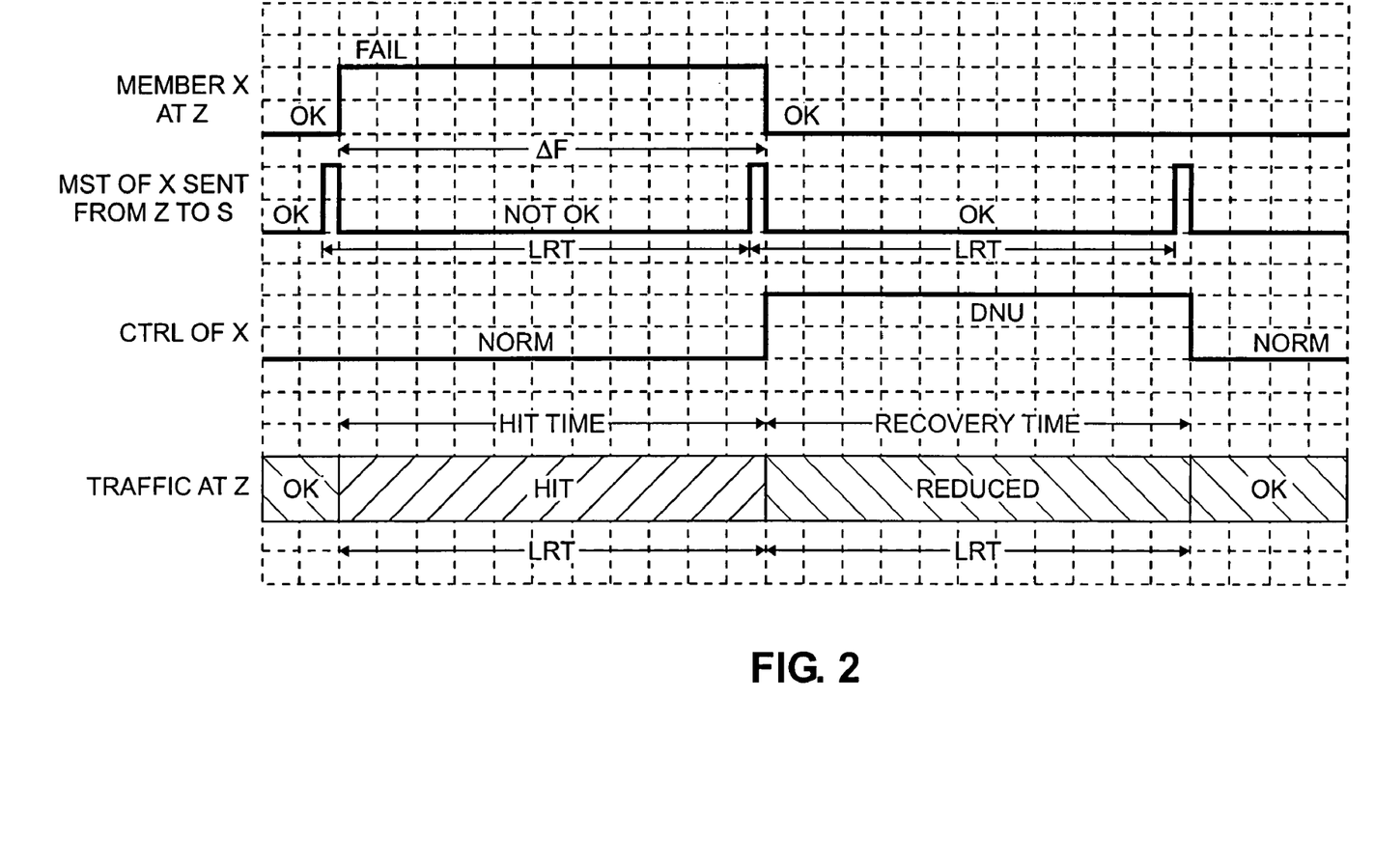
FIGS. 2, 3 and 4 are timing diagrams illustrating restoration time reductions achievable utilizing the techniques of the invention.

With reference now to FIG. 2, a timing diagram is shown illustrating the member failure signaling associated with the conventional LCAS protocol.

Figure 3:
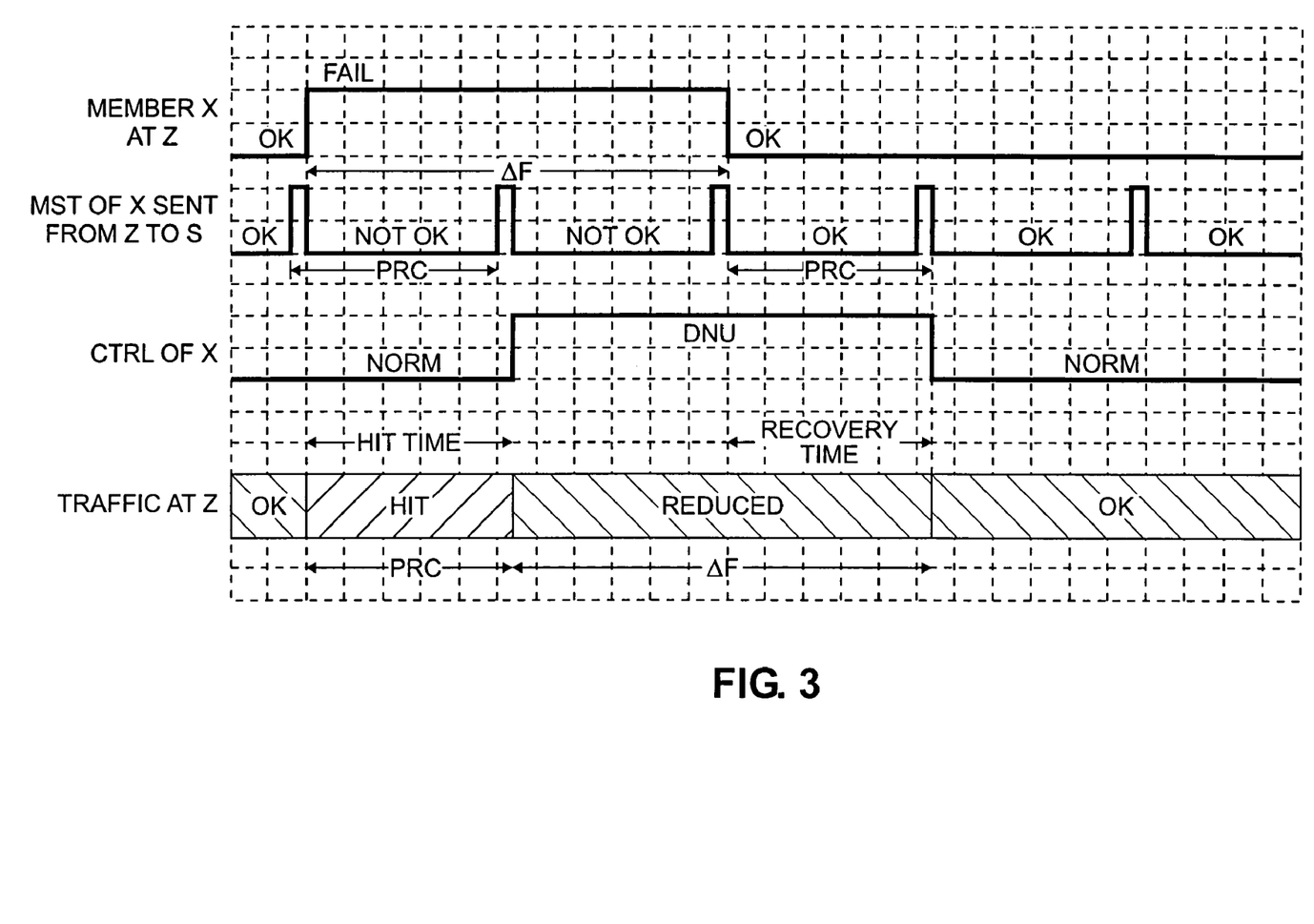
Figure 4:
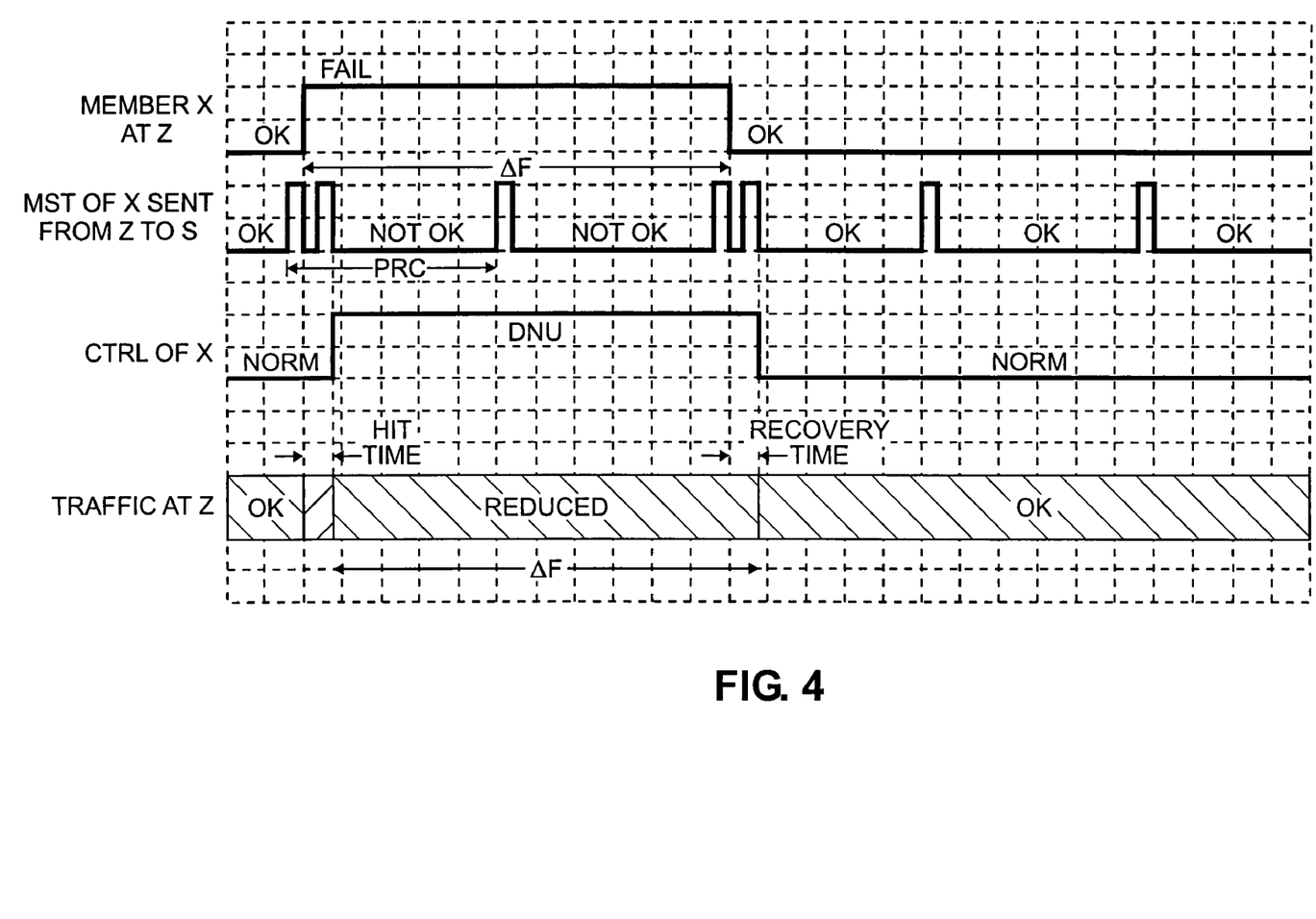

It is assumed for this timing diagram and the others described herein that a failure occurs for a given primary member X and that this failure is detected at sink node Z which then communicates the failure back to the source node S. Also, for simplicity and clarity of illustration, zero propagation delay is assumed. A further assumption made in the description of FIGS. 2, 3 and 4 is that, unless otherwise indicated, an HO implementation is described, with a maximum VCG group size of 256 members. However, those skilled in the art will recognize that the described techniques are equally applicable, with minor and straightforward modification, to an LO implementation with a maximum VCG group size of 64 members, as well as to other implementations.

It should be understood that these and other assumptions referred to herein are not requirements of the invention, and need not apply in other embodiments.

In the FIG. 2 timing diagram, a failure condition arises for member X as indicated by the uppermost signal in the diagram. The notation AF indicates the duration of the member failure condition. Member status (MST) information for member X is shown as the second signal in the diagram, and is transmitted from the sink node Z to the source node S as an OK or NOT-OK indicator, in accordance with the LCAS refresh time (LRT) of the conventional LCAS protocol. More specifically, the conventional LCAS protocol sequentially sends the MST information for each of 256 potential member streams, where as noted above 256 denotes the maximum number of members that may be present in a given VCG in an HO implementation, even though the given VCG may actually include many fewer members.

The conventional LCAS protocol thus does not account for current VCG size in sending MST information, and will send a complete cycle of 256 member statuses even when, for example, there are only two members present in the VCG.

As a result of this arrangement, the worst-case update interval for the MST information for any particular member of a given VCG is 64 milliseconds, regardless of the actual number of members contained within the given VCG.

The MST information for eight potential VCG members is sent in a 16-frame multiframe every two milliseconds. The conventional LCAS protocol uses the frame counter field of the MFI to identify the particular members whose MST information has been sent in a given 16-frame multiframe. More specifically, the frame counter field modulo 32 is used to identify the eight members for which MST information is sent in a given 16-frame multiframe. As indicated above, the LRT between transmission of MST information for failed member X from node Z to node S is therefore (256/8)*2 milliseconds=64 milliseconds.

The LCAS control word CTRL for the failed member X is also shown in FIG. 2, and as can be seen does not change from the NORM indicator to the DNU indicator until expiration of the LRT period. This results in a "hit" for the VCG data traffic as received at sink node Z, as shown in the diagram, since failure of a single member brings the entire group down until such time as the MST information of the failed member is reported back to the source node and the failed member is removed from the group.

After the failed member is removed and the failure is subsequently cleared, the LRT also limits the recovery time. As indicated in the diagram, the member failure is cleared just after the MST information is sent from sink node Z to source node S, but the member cannot be added back into the group until after expiration of the LRT. The VCG data traffic is therefore at a reduced level, as indicated in the diagram, until the updated status of the previously-failed member can be reported back to the source node and that member added back into the group.

The durations of the data traffic hit and recovery times in the FIG. 2 example are thus both limited by the LRT.

We have recognized that this conventional LCAS arrangement creates significant problems for restoration of EoS data traffic or other virtually-concatenated data traffic, in that it unduly limits the speed with which restoration can be carried out responsive to a member failure. A modified LCAS protocol which addresses this problem of the prior art will now be described with reference to the timing diagrams of FIGS. 3 and 4.

As mentioned previously, the modified LCAS protocol in the illustrative embodiments utilizes extra bits, taken from reserve bits defined in the above-noted standards documents, to send the MST information. More specifically, the modified LCAS protocol uses five of the reserve bits as a member status indicator, which can take on values from 0 to 31, with the value being updatable in each multiframe. Other member status indicator bit arrangements can be used in alternative embodiments. Unlike the MFI, which is also used for frame reconstruction and alignment and is therefore required to be sequentially incremented, the values indicated by the five extra bits have no such restriction, and can change in an arbitrary manner from multiframe to multiframe.

For a VCG with 256 members, the member status indicator bits provide substantially the same information as the MFI frame counter modulo 32.

However, when the VCG size is smaller than 256, the values taken on by the member status indicator vary depending upon the VCG size. By way of example, for a 16 member VCG, the member status indicator may be configured to take on values of 0 (00000) and 1 (00001) only. This allows the MST information of the 16 members to be sent in two multiframes, with the MST information for eight members being sent in each multiframe, thereby reducing the worst-case refresh time to four milliseconds. More specifically, the member status indicator values normally cycle from 0 (00000) to 1 (00001), with the MST information for eight of the sixteen members being transmitted in a multiframe with a member status indicator value of 0 (00000) while the MST information for the other eight of the sixteen members is transmitted in another multiframe with a member status indicator value of 1 (00001).

The modified LCAS protocol thus sends MST information only for those members that are currently part of the VCG. When utilized in conjunction with the restoration technique described in conjunction with FIGS. 1A and 1B, restoration times of less than about 32 milliseconds can be achieved for VCGs having less than 128 members.

Referring now to FIG. 3, a timing diagram illustrating the operation of the modified LCAS protocol is shown. As in the FIG. 2 example, there is a failure of member X which is cleared after a failure duration of ΔF. However, with the modified LCAS protocol, the sending of the MST information is not limited by the LRT, and can instead be sent in a period denoted PRC in the diagram. This results in a considerable reduction in the data traffic hit and recovery times as indicated, and thus the restoration time.

An additional mechanism can be used to further reduce the restoration time when using the modified LCAS protocol described above. More particularly, the sink node 14 may be configured in accordance with the invention to maintain for each VCG a list of buckets. The total number of buckets B required at any given time is defined as:

$$B = \lfloor |VCG|/8 \rfloor,$$

where |VCG| denotes the number of members in the VCG. Therefore, since the maximum allowed size for a VCG is 256 members, the maximum value of B is 32.

Each bucket is identified by an ID field. When a member fails, its sequence number (SQ) in the VCG is identified. The SQ is used to compute the bucket ID for this member based on the following formula:

$$ID = \lfloor SQ/8 \rfloor.$$

Bucket IDs correspond only to values of the member status indicator, but the actual MST information is maintained separately. If a bucket with an ID computed in the manner described above already exists at the time of the member failure, then nothing further is done. Otherwise, the first available bucket in the list is assigned the computed bucket ID. During normal operation, when no member has failed, the member status indicator values cycle from 0 to B−1, such that MST information can be sent for all members that are currently part of the VCG. As in the conventional LCAS protocol, each multiframe includes the MST information for eight members.

However, when one of the member fails, this normal refresh cycle is broken. The bucket ID of the failed member is determined in the manner described above, and then assigned to the top bucket in the list. The sink node then sends the particular member status indicator value corresponding to this bucket ID and the status of the corresponding eight members.

If more members with different bucket IDs failed during this period of time, remaining ones of the B buckets are filled. This ensures that at no point in time will any two buckets in the list have the same bucket ID. Buckets are assigned IDs in order of the failed member arrival. When multiple members fail simultaneously, buckets can be assigned IDs in any order. Once the member status indicator value for the top bucket has been sent in a given multiframe, it is subsequently "freed" by first removing its assigned bucket ID so as to remove it from the top of the list, and then adding it to the tail of the list. When the top of the bucket list is empty, the normal member status indicator refresh cycle is resumed.

This mechanism does not wait for the turn of the failed member to arrive in the normal member status indicator refresh cycle, and instead breaks the cycle to send the member status indicator of the failed member. It ensures that the MST information of the first failed member can be sent in the first multiframe, and thus allows a restoration time on the order of about two milliseconds regardless of the number of members in the VCG.

FIG. 4 shows the timing diagram for the example failure of member X with the use of the modified LCAS protocol and the additional bucket-based mechanism described above. It can be seen that the data traffic hit and recovery times in this example are now considerably shorter than in the timing diagram of FIG. 3, as a result of the use of the additional mechanism.

In the event that m members with n distinct bucket IDs fail simultaneously, the time taken to report the status of the last member to fail will be on the order of 2n milliseconds. Therefore, for n=B, when the failed member bucket IDs map to all B buckets, the worst-case time taken to report member failure will be 2B milliseconds, or 64 milliseconds for a 256-member VCG (B=32). It should be noted, however, that this is an unlikely scenario. For most practical cases, the restoration time is substantially reduced.

When a failed member recovers, its MST information changes from NOT-OK to OK. This also breaks the member status indicator cycle to allow the MST information of the recovered member to be sent in the first multiframe, enabling a faster recovery. Similarly, requests to add one or more new members to the VCG will break the member status indicator cycle, allowing faster addition of the new member(s). Other types of events can be handled in this manner as well.

In an LO implementation of the above-described technique, the member status indicator need only include three bits rather than the five bits used in the HO implementation, reducing the maximum number of buckets in the list to eight.

As indicated above, a restoration technique in accordance with the present invention can be implemented in one or more network nodes. Exemplary network and network node implementations of the invention will now be described with reference to FIGS. 5, 6 and 7.

Figure 5:
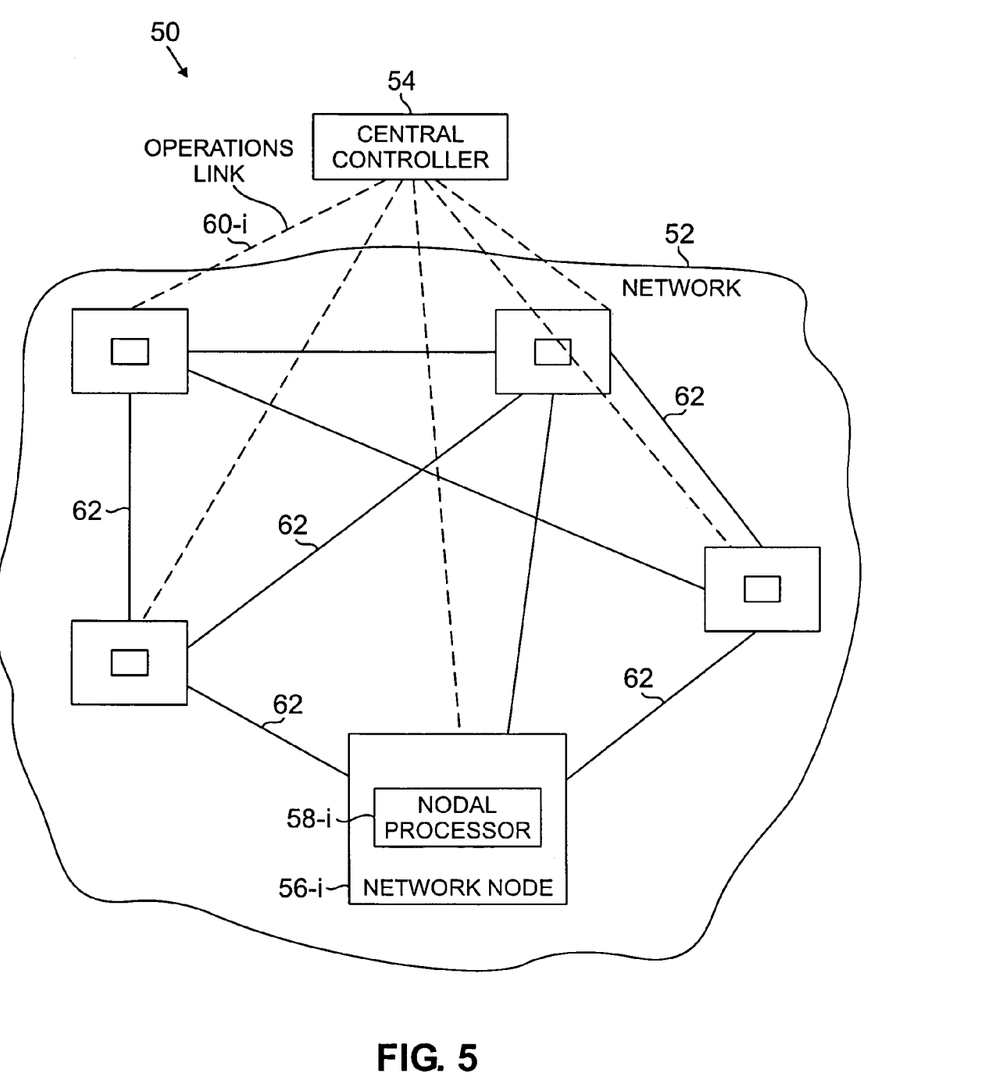
FIG. 5 shows an example network-based system in which a restoration technique in accordance with the invention is implemented.

FIG. 5 shows an exemplary network-based system 50 in which techniques of the present invention can be implemented. The system 50 includes a network 52 and a central controller 54. The network 52 may comprise, by way of example, an Internet protocol (IP)-optical wavelength division multiplexed (WDM) mesh network, although the invention may be utilized with any type of network. The network 52 includes a number of nodes 56-i, i=1, 2, . . . N. Each of the nodes 56-i includes a corresponding nodal processor 58-i. The nodes 56-i of network 52 are interconnected by, for example, optical fiber connections 62. In this example, each of the nodes 56-i has a fiber connection to three other nodes. Each of the nodes 56-i is also connected to the central controller 54 via a corresponding operations link 60-i, shown as a dashed line in FIG. 5.

The central controller 54 and nodes 56-i may each represent a computer, server, router, gateway or other suitable digital data processor programmed to provide a restoration technique of the present invention.

It should be noted that the system of FIG. 5 is considerably simplified for purposes of illustration. The invention is well-suited for use in large-scale regional, national and international networks which may include many subnetworks, each having hundreds of nodes.

The central controller 54 may or may not participate in network restoration, depending upon the particular implementation. For example, a fully distributed implementation need not utilize the central controller 54.

Figure 6:
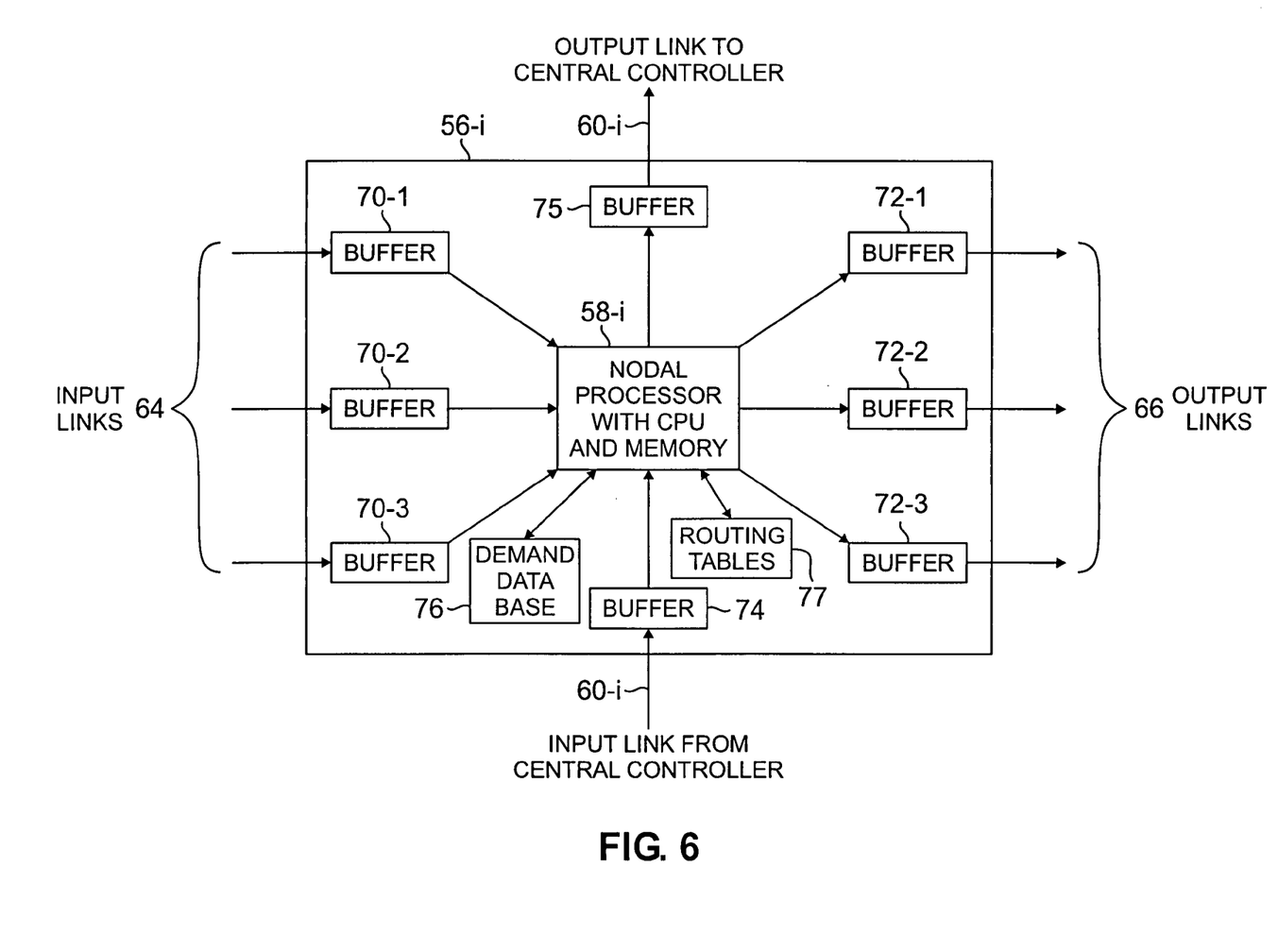
FIGS. 6 and 7 show different possible implementations of a given network node in the FIG. 5 system.

FIG. 6 shows one of the nodes 56-i of network 52 in greater detail. The node 56-i includes a nodal processor 58-i which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-*i* of node 56-*i* to the central controller 54 includes an input operational link which is coupled to nodal processor 58-*i* via an input buffer 74, and an output operational link which receives signals from nodal processor 58-*i* via an output buffer 75. The node 56-*i* also includes a demand database 76 for storing demands for network capacity, and a set of routing tables which specify routes through the network for particular demands. The demand database 76 and routing tables 77 may be components of a common memory within node 56-*i*, and may be combined with or otherwise associated with the memory of nodal processor 58-*i*. The node 56-*i* has been simplified for purposes of illustration, and as noted above may include a substantially larger number of input and output links, as required for a given application.

Figure 7:
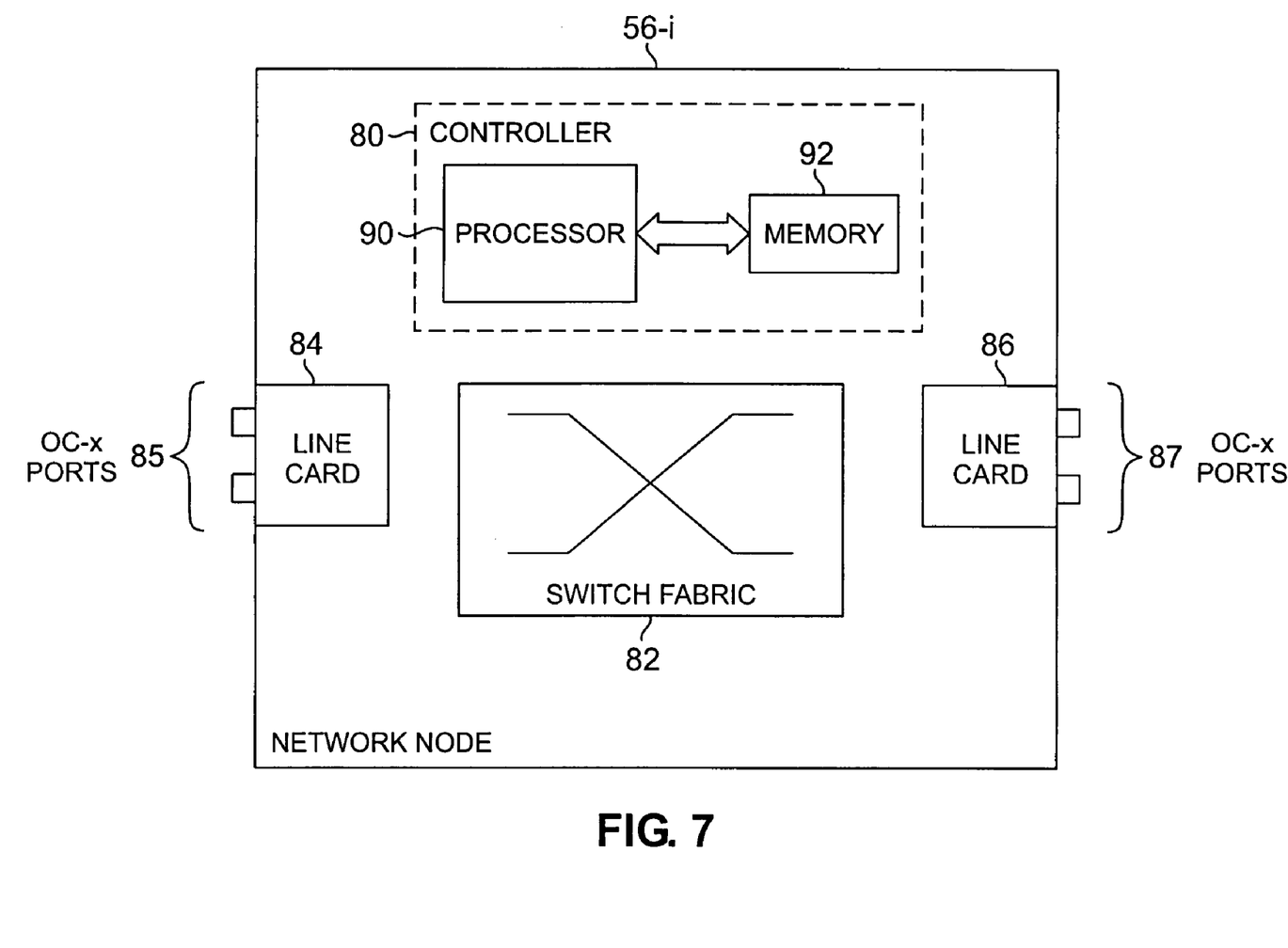

FIG. 7 shows another exemplary implementation of a given one of the network nodes 56-*i* of the FIG. 5 network-based system.

The network node 56-*i* in this example includes a controller 80, a switch fabric 82, a first line card 84 having a set of OC-x ports 85 associated therewith, and a second line card 86 having a set of OC-x ports 87 associated therewith. It should be understood that the node 56-*i* has again been simplified for purposes of illustration. For example, the node 56-*i* as shown in FIG. 7 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using a restoration technique of the present invention.

As indicated previously, the node 56-*i* may be an element of an optical network or other type of network which includes a very large number of nodes, and possibly a central controller. One or more of the nodes and the central controller may each represent a computer, processor-based switch or other type of processor-based device configured to provide restoration in accordance with the invention.

The implementations described in conjunction with FIGS. 5, 6 and 7 are presented by way of example, and it is to be appreciated that the invention can be implemented in numerous other applications.

Advantageously, the present invention provides low-overhead, standards-compliant fast restoration techniques for EoS data traffic or other types of data traffic which utilize virtual concatenation.

Another advantage of the techniques in the illustrative embodiments is that these techniques may be configured for backwards compatibility with existing VC and LCAS standards, thereby allowing a network element configured to implement a restoration technique of the present invention to interoperate with standard VC and LCAS enabled network elements.

For example, with regard to the backwards-compatibility aspect of the invention, a first network element running a modified LCAS protocol as described herein may be made compatible with a second network element running the conventional LCAS protocol in the following manner. At startup, the first network element initially assumes that the second network element is also running the modified LCAS protocol. If the first network element subsequently observes that the above-described member status indicators are being received from the second network element with values of 00000 or 000, for respective HO and LO implementations, in a designated number of consecutive multiframes, it determines that the second network element is actually running the conventional LCAS protocol rather than the modified LCAS protocol. The first network element then drops the additional features associated with the modified LCAS protocol, and operates in accordance with the conventional LCAS protocol. Other techniques may be used to provide backward compatibility in a given embodiment of the invention.

The above-described embodiments of the invention are intended to be illustrative only. For example, the restoration techniques of the invention may be applied to any routing application, without regard to the type, arrangement or configuration of the network, network nodes, or communication protocols. In addition, the modified LCAS protocol of the invention may be used in applications other than restoration, such as facilitating addition or deletion of members from a given VCG.

These and numerous other alternative embodiments within the scope of the following claims will be readily apparent to those skilled in the art.

We claim:

1. A method for restoration of virtually-concatenated data traffic in a network comprising at least first and second nodes, the method comprising the steps of:

forming a virtually-concatenated group comprising: (i) a plurality of primary members each associated with a corresponding data stream, and (ii) at least one backup member; and responsive to a failure of a given one of the plurality of primary members, utilizing the backup member for restoring data traffic of the given member;

wherein the failure is indicated by member status information sent by one of the nodes operating as a sink node to another of the nodes operating as a source node;

wherein particular ones of the primary members for which member status information is carried in a given framing unit are identified by a member status indicator transmitted in that framing unit;

wherein the member status indicator is one of a plurality of member status indicators that change from framing unit to framing unit in accordance with a normal cycle of such member status indicators; and wherein in conjunction with the failure, the normal cycle of member status indicators is broken in order to expedite the sending of member status information for the given primary member.

2. The method of claim 1 wherein each of the plurality of primary members and the backup member of the virtually-concatenated group is assigned a corresponding one of a plurality of data transmission routes between the first and second nodes of the network.

3. The method of claim 2 wherein responsive to a failure of a route assigned to a given one of the plurality of primary members, the route assigned to the backup member is utilized as a backup route for restoring data traffic of the given member.

4. The method of claim 1 wherein each of the plurality of primary members and the backup member is assigned a corresponding route between the first and second nodes that is fully diverse from the routes assigned to the other members.

5. The method of claim 1 wherein the backup member comprises a single additional member.

6. The method of claim 1 wherein each of the plurality of primary members is assigned a corresponding route between the first and second nodes that is not fully diverse from the routes assigned to the other primary members.

7. The method of claim 1 wherein the backup member comprises a plurality of additional members of a designated minimum number.

8. The method of claim 7 wherein the designated minimum number of additional members is determined as the total number of the primary members which share a link that carries data traffic from the greatest number of the primary members.

9. The method of claim 1 wherein the framing units comprise multiframes.

10. The method of claim 9 wherein the sink node sends the member status information to the source node for eight of the members in a given 16-frame multiframe.

11. The method of claim 1 wherein the sink node sends the member status information to the source node only for actual members of the virtually-concatenated group.

12. The method of claim 9 wherein the sink node sends the member status information to the source node in accordance with a modified LCAS protocol in which a plurality of reserve bits are utilized as a member status indicator that is updatable in an arbitrary manner from multiframe to multiframe, the member status indicator for a given multiframe specifying a particular set of the members for which member status information is sent in the given multiframe.

13. The method of claim 12 wherein the member status indicator comprises one of a five-bit indicator and a three-bit indicator.

14. The method of claim 1 wherein the sink node maintains for the virtually-concatenated group a list of B buckets, with each bucket capable of being identified by a bucket identifier corresponding to a member status indicator, such that in the absence of failures the member status indicator values cycle from 0 to B-1.

15. A method for restoration of virtually-concatenated data traffic in a network comprising at least first and second nodes, the method comprising the steps of:
forming a virtually-concatenated group comprising: (i) a plurality of primary members each associated with a corresponding data stream, and (ii) at least one backup member; and
responsive to a failure of a given one of the plurality of primary members, utilizing the backup member for restoring data traffic of the given member;
wherein a route failure is indicated by member status information sent by one of the nodes operating as a sink node to another of the nodes operating as a source nodes;
wherein the sink node maintains for the virtually-concatenated group a list of B buckets, with each bucket capable of being identified by a bucket identifier corresponding to a member status indicator, such that in the absence of failures the member status indicator values cycle from 0 to B-1; and
wherein the bucket identifier of a first bucket in the list of B buckets specifies a member status indicator indicating the particular members for which member status information is sent from the sink node to the source node in a current multiframe.

16. A method for restoration of virtually-concatenated data traffic in a network comprising at least first and second nodes, the method comprising the steps of:
forming a virtually-concatenated group comprising: (i) a plurality of primary members each associated with a corresponding data stream, and (ii) at least one backup member; and
responsive to a failure of a given one of the plurality of primary members, utilizing the backup member for restoring data traffic of the given member;
wherein a route failure is indicated by member status information sent by one of the nodes operating as a sink node to another of the nodes operating as a source node;
wherein the sink node maintains for the virtually-concatenated group a list of B buckets, with each bucket capable of being identified by a bucket identifier corresponding to a member status indicator, such that in the absence of failures the member status indicator values cycle from 0 to B-1; and
wherein in conjunction with at least one of failure of a member, recovery of a previously-failed member, and addition of a member to the virtually-concatenated group, a bucket identifier is determined for the corresponding member as a function of a sequence number of that member, and assigned to a first bucket in the list of B buckets, such that a normal cycle of the member status indicators is broken in order to expedite the sending of member status information for the affected member(s).

17. A method for restoration of virtually-concatenated data traffic in a network comprising at least first and second nodes, the method comprising the steps of:
forming a virtually-concatenated group comprising: (i) a plurality of primary members each associated with a corresponding data stream, and (ii) at least one backup member; and
responsive to a failure of a given one of the plurality of primary members, utilizing the backup member for restoring data traffic of the given member;
wherein a route failure is indicated by member status information sent by one of the nodes operating as a sink node to another of the nodes operating as a source node;
wherein the sink node maintains for the virtually-concatenated group a list of B buckets, with each bucket capable of being identified by a bucket identifier corresponding to a member status indicator, such that in the absence of failures the member status indicator values cycle from 0 to B-1: and
wherein the list of buckets is configured such that no two buckets are assigned the same bucket identifier at any given point in time.

18. The method of claim 1 wherein the primary members are distinguished from the backup member in normal operation at least in part by utilizing a first indicator value in a control word of each primary member and a second indicator value in a control word of the backup member.

19. The method of claim 1 wherein responsive to a failure of a route assigned to the given one of the plurality of primary members, a first indicator value in a control word of the given primary member is swapped with a second indicator value in a control word of the backup member.

20. The method of claim 1 wherein the forming and utilizing steps are implemented at least in part in software running on a processor of a node of the network.

21. An apparatus for use in restoration of virtually-concatenated data traffic in a network comprising at least first and second nodes, the apparatus comprising:
a processor; and
a memory coupled to the processor;
wherein the processor is operative to control execution of a restoration algorithm; and wherein the restoration algorithm forms a virtually-concatenated group comprising: (i) a plurality of primary members each associated with a corresponding data stream, and (ii) at least one backup member; and responsive to a failure of a given one of the plurality of primary members, utilizes the backup member for restoring data traffic of the given member;

wherein the failure is indicated by member status information sent by one of the nodes operating as a sink node to another of the nodes operating as a source node;

wherein particular ones of the primary members for which member status information is carried in a given framing unit are identified by a member status indicator transmitted in that framing unit;

wherein the member status indicator is one of a plurality of member status indicators that change from framing unit to framing unit in accordance with a normal cycle of such member status indicators; and wherein in conjunction with the failure, the normal cycle of member status indicators is broken in order to expedite the sending of member status information for the given primary member.

22. An article of manufacture comprising a machine-readable medium containing one or more programs for use in restoration of virtually-concatenated data traffic in a network comprising first and second nodes, the one or more programs when executed implementing the steps of:

forming a virtually-concatenated group comprising: (i) a plurality of primary members each associated with a corresponding data stream, and (ii) at least one backup member; and responsive to a failure of a given one of the plurality of primary members, utilizing the backup member for restoring data traffic of the given member;

wherein the failure is indicated by member status information sent by one of the nodes operating as a sink node to another of the nodes operating as a source node;

wherein particular ones of the primary members for which member status information is carried in a given framing unit are identified by a member status indicator transmitted in that framing unit;

wherein the member status indicator is one of a plurality of member status indicators that change from framing unit to framing unit in accordance with a normal cycle of such member status indicators; and wherein in conjunction with the failure, the normal cycle of member status indicators is broken in order to expedite the sending of member status information for the given primary member.

23. A method for processing virtually-concatenated data traffic in a network comprising at least first and second nodes, the method comprising the steps of:

forming a virtually-concatenated group comprising a plurality of members; and determining that a given one of the members has failed based at least in part on member status information sent by the second node to the first node;

wherein the second node sends the member status information to the first node in accordance with a protocol in which a member status indicator is updatable in an arbitrary manner from multiframe to multiframe, the member status indicator for a given multiframe specifying a particular set of the members for which member status information is sent in the given multiframe;

wherein the member status indicator is one of a plurality of member status indicators that change from multiframe to multiframe in accordance with a normal cycle of such member status indicators; and wherein in conjunction with the failure, the normal cycle of member status indicators is broken in order to expedite the sending of member status information for the given member.

* * * * *